(12) United States Patent
Hatano et al.

(10) Patent No.: US 6,578,453 B1
(45) Date of Patent: Jun. 17, 2003

(54) INSIDE DIAMETER MACHINING METHOD

(75) Inventors: Sakae Hatano, Aichi-ken; Yasuyuki Hara, Komaki, both of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 0 days.

(21) Appl. No.: 09/651,958

(22) Filed: Aug. 31, 2000

(30) Foreign Application Priority Data

May 31, 2000 (JP) .......................................... 2000-162607

(51) Int. Cl.$^7$ .............................. B23B 1/00; B23B 41/00
(52) U.S. Cl. ............................... 82/1.11; 82/1.3; 82/1.5; 82/82
(58) Field of Search .............................. 82/1.5, 1.4, 1.3, 82/1.2, 1.11, 82, 83, 86

(56) References Cited

U.S. PATENT DOCUMENTS

| | | | | |
|---|---|---|---|---|
| 4,750,392 A | * | 6/1988 | Hong | |
| 4,945,792 A | * | 8/1990 | Gardner | |
| 5,086,676 A | * | 2/1992 | Gifford et al. | |
| 5,141,063 A | * | 8/1992 | Quesenbury | |
| 5,159,862 A | * | 11/1992 | Byrnes et al. | |
| 5,967,007 A | * | 10/1999 | Scheer | |

* cited by examiner

Primary Examiner—Henry Tsai
(74) Attorney, Agent, or Firm—Wolf, Block, Schorr and Solis-Cohen LLP; Richard P. Gilly

(57) ABSTRACT

An inside diameter machining method for machining inside a workpiece uses a turning tool utilized within a main body in the shape of a bar with a hook-shaped top end portion which has a cutting portion. When the machining diameter of the portion to be machined inside the workpiece is bigger than the workpiece's tool insertion hole, the workpiece interferes with the tool when the turning tool's top end portion is moved linearly. To overcome the interference, moving the turning tool's top end portion in two axial directions orthogonal to each other and in a rotational direction with a third axial direction orthogonal to the other two axial directions as its center permits the top end portion to be inserted into the tool insertion hole. The turning tool's cutting portion is then positioned at the portion to be machined inside the workpiece. Turning machining subsequently can be commenced.

3 Claims, 3 Drawing Sheets

FIG. 3

| MOVEMENT OF CENTER OF TURRET | | | |
|---|---|---|---|
| POINT | X | Z | B |
| A | 0 | 0 | 0 |
| B | 0 | −9 | 0 |
| C | 2.1 | −18 | 0 |
| D | −9.8 | 48.7 | 10 |
| E | −32.8 | 111.6 | 20 |
| F | −116.6 | 226.6 | 40 |
| G | −233.8 | 303.1 | 60 |
| H | −440 | 329 | 90 |
| I | −440 | 285 | 90 |

| MOVEMENT OF TOOL EDGE | | | |
|---|---|---|---|
| POINT | X | Z | B |
| A | 0 | 0 | 0 |
| B | 0 | −9 | 0 |
| C | 2.1 | −18 | 0 |
| D | 5.3 | −27 | 10 |
| E | 10.1 | −36 | 20 |
| F | 17.2 | −45 | 40 |
| G | 27.8 | −54 | 60 |
| H | 48.2 | −63 | 90 |
| I | 48.2 | −107 | 90 |

INSIDE DIAMETER MACHINING METHOD

BACKGROUND OF THE INVENTION

This invention relates to an inside diameter machining method suitable for turning machining in order to form a machining hole, such as a bag hole having the entrance of a hole smaller than the machining diameter of its inside.

In this kind of bag hole machining in a conventional way, a cutting tool for boring fitting to the machining diameter of the inside can not be inserted into the inside of a workpiece since the entrance of a hole is smaller than the machining diameter of the inside. Then, the machining with the cutting tool for boring is impossible. So, the machining is performed in such a state that the formed tool formed in the shape to be machined in advance is set in a workpiece.

But, since in such a way it is necessary to prepare a specific formed tool, this way can not be used for general purposes. Besides, complex arrangement, such as setting a formed tool in a workpiece, is necessary, and efficient machining is impossible.

In addition, it is difficult to improve the machining accuracy in the machining with a formed tool.

The object of the present invention is to provide inside diameter machining method capable of performing bag hole machining using a normal cutting tool, such as a cutting tool for boring, without using formed tool, taking the above-mentioned circumstances into consideration.

SUMMARY OF THE INVENTION

The invention of claim 1 is inside diameter machining method in boring machining for machining inside a workpiece using a turning tool having cutting portion at an end portion of its main body in the shape of a bar, comprising:

at the time of turning machining on the machining hole where the size of a tool insertion hole of the workpiece into which the turning tool (for instance, the diameter D2, is not always a circular hole) is inserted is smaller than the machining diameter of the portion to be machined inside the workpiece, moving said turning tool in a first axial direction and in a second axial direction orthogonal to each other (for instance, the X-axis direction and the Z-axis direction) and in a rotational direction (for instance, the B-axis direction) with a third axial direction orthogonal to both first and second axial directions (for instance, the Y-axis direction) as its center from said tool insertion hole of a workpiece to be machined along tool shape of said turning tool so as to position cutting portion of said turning tool at the portion to be machined inside the workpiece; and starting turning machining on the portion to be machined of said workpiece in the above-mentioned state.

In the invention of claim 1, by moving the turning tool in the rotational direction (for instance, the B-axis direction) with the third axial direction (for instance, the Y-axis direction) as its center, the cutting portion of the turning tool can be positioned at the portion to be machined of the inside of the workpiece with no interference between the turning tool and the workpiece. Then, the machining for forming machining hole, such as a bag hole, is possible without using a formed tool as a turning tool.

In the invention of claim 2, turning tool is held by turning tool holding means provided with a spindle side for rotating and driving said workpiece at the time of machining of the inside of said workpiece so as to prevent chatter of the turning tool.

According to the invention of claim 2, accurate inside diameter machining is possible since the chatter of the cutting tool can be effectively prevented by the cutting tool holding means.

In the invention of claim 3, firstly, the top end portion of said turning tool is inserted into said tool insertion hole, subsequently the main body portion of the turning tool continuing to the top end portion is inserted, and furthermore the main body portion of the turning tool continuing to the inserted main body portion is inserted when the turning tool is inserted into said workpiece.

According to the invention of claim 3, the turning tool is gradually inserted into the tool insertion hole along the whole length of the tool body, starting the top end portion thereof. Then, the turning tool can pass through the tool insertion hole of the workpiece, making use of the portion which section is the smallest, and the occurrence of the interference between the workpiece and the turning tool can be effectively prevented.

BRIEF DESCRIPTION OF THE DRAWINGS

FIG. 3 is a view showing passing coordinates of a tool rest and a tool edge in FIG. 2 with their B-axis rotational angle.

DESCRIPTION OF THE PREFERRED EMBODIMENT

Figure 1:
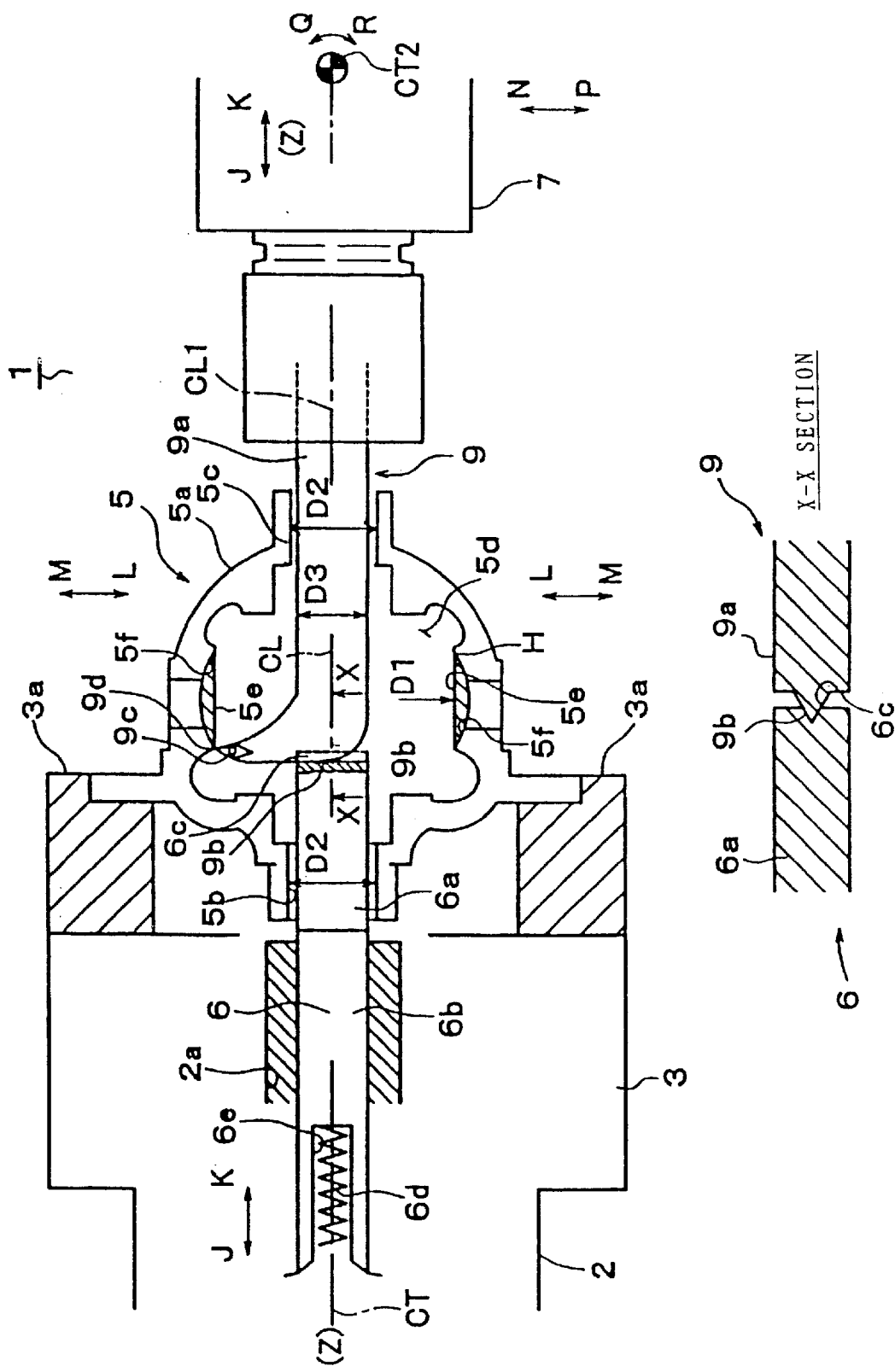
FIG. 1 is a view showing an example of bag hole machining with a machine tool to which the present invention is applied.

A machine tool 1 has a spindle 2 rotatably and drivably provided around an axial center CT parallel to Z-axis, as shown in FIG. 1. A chuck 3 is rotatably provided with the spindle 2 around the axial center CT together with the spindle 2. A plurality of claws 3a are movably and drivably provided with the chuck 3 in the direction as shown by arrows M and L which is the radial direction orthogonal to the axial center CT (the Z-axis). A workpiece 5 on which boring machining is performed is held by the claws 3a corresponding the center CL of the workpiece with the axial center CT of the spindle.

A through hole 2a is formed in the spindle 2 in the direction as shown by arrows J and K which is the axial center CT direction. A chatter prevention bar 6 is provided with the through hole 2a, being free to move and drive in the direction as shown by the arrows J and K by a cylinder driving unit which is not shown. A pusher 6a is supported by the top end portion of a main body 6b of the chatter prevention bar 6, being relatively rotatable with respect to the main body 6b (it is not always relatively rotatable, but the pusher 6a may be fixed with respect to the main body 6b). An engagement slot 6c which section has V-character shape is formed on the top end portion of the pusher 6a in the direction as shown by the arrows M and L which is orthogonal direction with respect to the axial center CT. A hole 6e is formed on the main body 6b of the chatter prevention bar 6 in the axial center CT direction, and a coiled spring 6d is provided with the hole 6e so as to shrink.

On the right hand of the spindle 2 of the figure, a tool holder 7 installed on a tool rest (not shown) is movably and drivably provided in the direction as shown by the arrows J and K which is the Z-axis direction and in the X-axis direction orthogonal to the Z-axis direction, that is, in the direction as shown by the arrows N and P. The tool holder 7 is provided being free to rotate, position and drive in the direction as shown by the arrows Q and R with a predetermined axis CT2 orthogonal to the paper, that is, the Y-axis orthogonal to the X-axis and the Z-axis as its center, that is, in the B-axis direction. Furthermore, a cutting tool 9 for boring is attachably and detachably installed on the tool holder 7.

The cutting tool 9 has a main body 9a formed such that the top end of a bar member having the diameter D3 is bent in the shape of key. A projection 9b having the shape corresponding to the engagement slot 6c of the chatter prevention bar 6 in its section is formed at the top end portion of the main body 9a. The top end of the main body 9a is bent on the upper hand of FIG. 1, and a chip 9c is installed on its end.

On the other hand, the workpiece 5 installed on the chuck 3 through the claw 3a has a main body 5a formed in almost sphere shape as a whole. On both sides, right and left of the figure of the main body 5a, through holes 5b, 5c which diameter is D2, are formed, corresponding the workpiece center CL with its center. An inside space 5d in the shape of almost sphere is formed inside the main body 5a. Inner cylindrical faces 5e on which turning machining is performed, which diameter is D1, are formed on the lower and upper hands of the figure facing the inside space 5d of the main body 5a. On this occasion, the diameter D2 of the through hole 5c is bigger than the diameter D3 of the bar member comprising the main body 5a of the cutting tool 9. Furthermore, the diameter D1 of the inner cylindrical face 5e is bigger than the diameter D2 of the through hole 5c, then it is a so-called bag hole.

The machine tool 1 has the above-mentioned structure. Then, in order to perform inside diameter machining on the inner cylindrical face 5e of the workpiece 5 as shown by the hatching of FIG. 1, programming is performed in such a manner that the chip 9c which is on the top end of the cutting tool 9 for boring held by the tool holder 7 is positioned at a predetermined machining start point H (see FIG. 2) of the inner cylindrical face 5e of the workpiece 5 with a numerically controlled machine of the machine tool 1 (not shown).

Figure 2:
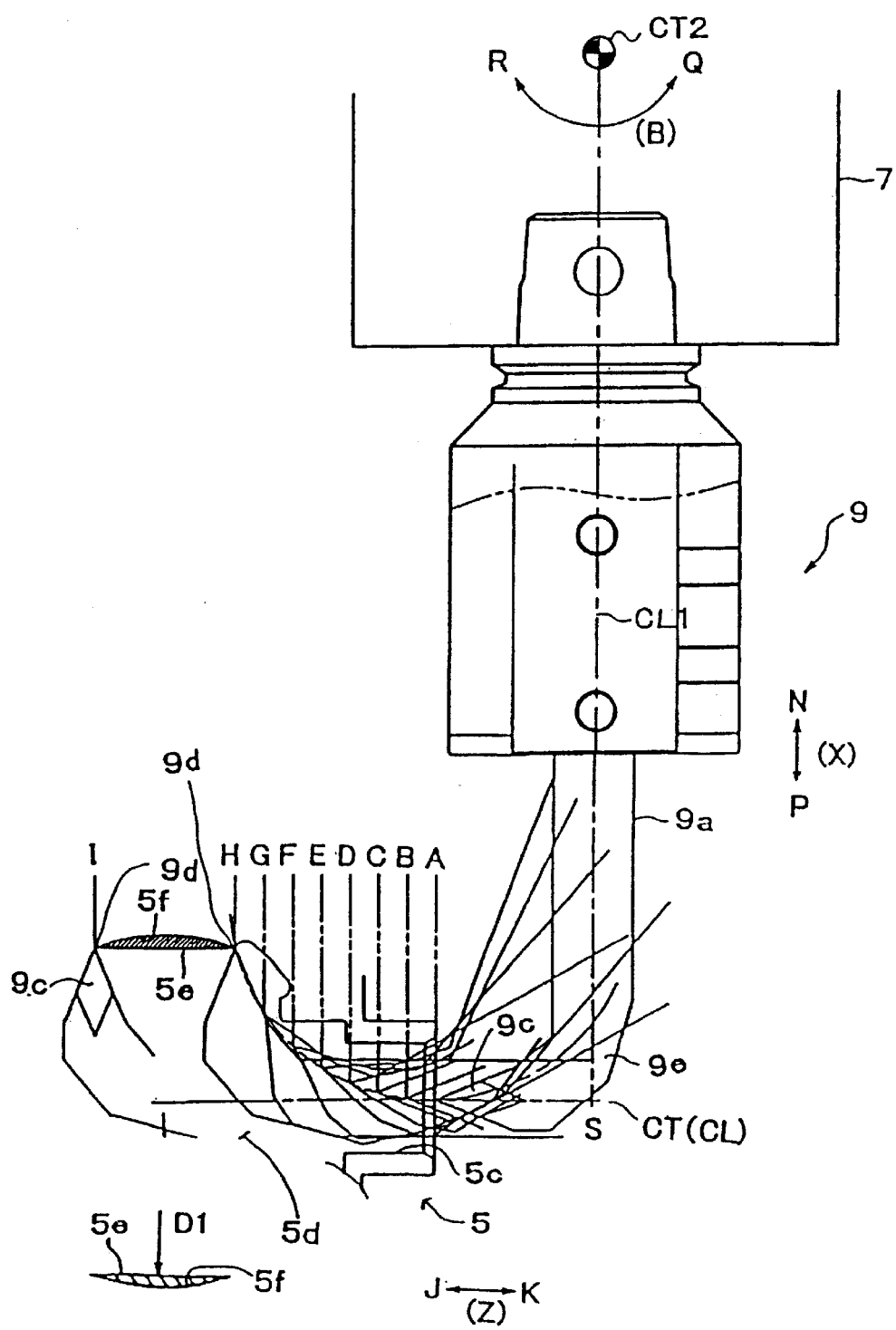
FIG. 2 is a view showing an example of moving state of a tool.

When the cutting tool 9 is moved on the left hand of the figure, that is, in the Z-axis direction, corresponding the axial center CL1 of its main body 9a with the workpiece center CL as shown in FIG. 1, the cutting tool 9 and the workpiece 5 interfere with each other, as clear from FIG. 1, then the chip 9c which is on the top end of the cutting tool 9 can not be positioned at the machining start point H. Then, the tool pass is instructed in the program as shown in FIGS. 2 and 3 in such a manner that the axial center CL1 of the cutting tool 9 is positioned in the direction parallel to the X-axis direction, and in this state, the tool holder 7 is moved and driven in the X-axis direction (in the direction as shown by the arrows N and P) and in the Z-axis direction (in the direction as shown by the arrows J and K), and at the same time, is rotated and driven in the B-axis direction (in the direction as shown by the arrows Q and R) which is the rotational direction with the Y-axis as its center, which is orthogonal direction with respect to the X-axis and the Z-axis so as to position a top end 9d of the chip 9c at the machining start point H via the points A, B, C, D, E, F and G from the waiting point S, as shown in FIG. 2. On this occasion, the tool rest may be moved in the Y-axis direction together with the tool holder 7 so as to prevent the interference between the cutting tool 9 and the workpiece 5, if necessary.

By such a programming, the cutting tool 9 is entered into the through hole 5c of the workpiece 5 with no interference with the workpiece 5, rotating the whole in the right direction of FIG. 2 such that the bar-shaped main body 9a is along the bent shape of the main body 9a so as to position the top end of the chip 9c at a predetermined machining start point H, as shown in FIG. 2. Since the diameter D2 of the through hole 5c of the workpiece 5 is bigger than the diameter D3 of the main body 9a of the cutting tool 9, the interference between the cutting tool 9 and the workpiece 5 can be prevented by entering the cutting tool 9 into the through hole 5c along the bent shape of the cutting tool 9. Such a program can be easily composed by using a known teaching.

When the above-mentioned program is composed, the spindle 2 is rotated and driven so as to rotate the workpiece 5 with the axial center CT as its center through the chuck 3. In this state, the chip 9c portion of the top end portion of the cutting tool 9 is faced on the right hand of the FIG. 2 of the through hole 5c (waiting position S) by the above-mentioned program. Subsequently, the chip 9c is moved in the direction as shown by the arrow J of the figure, and the top end of the chip 9c is inserted into the top end portion of the right hand of the figure of the through hole 5c (the points A and B). In this state, the top end of the chip 9c is gradually moved in the direction as shown by the arrow J so as to enter the top end portion of the cutting tool 9 into the through hole 5c. And, the main body of the cutting tool 9 is gradually rotated in the direction as shown by the arrow R so as to enter a bent portion 9e into the through hole 5c with no interference between the bent portion 9e of the top end of the cutting tool body 9a and the workpiece 5 (the points C, D, E, F, and G). The cutting tool 9 is gradually inserted into the inside space 5d from the through hole 5c, starting from its top end portion in such a manner that by rotating the cutting tool 9 in the direction as shown by the arrow R, while being moved a predetermined distance in the direction as shown by the arrow J in this way, the top end portion of the main body 9a of the cutting tool 9 is inserted into the through hole 5c, the main body 9a portion of the cutting tool 9 continuing to the top end portion is inserted into the through hole 5c, and furthermore, the main body portion of the cutting tool 9 continuing to the inserted main body portion is inserted into the through hole 5c. In this way, the top end 9d of the chip 9c is inserted into the inside space 5d from the through hole 5c of the workpiece 5 so as to position at a predetermined machining starting point H. By doing so, the cutting tool 9 can pass the through hole 5c of the workpiece 5, making use of the portion which section is the smallest, and occurrence of interference between the workpiece 5 and the cutting tool 9 can be effectively prevented.

Subsequently, the chatter prevention bar 6 in the spindle 2 is projected and driven in the direction as shown by the arrow K of FIG. 1 through a cylinder driving unit which is not shown and the coiled spring 6d so as to project the pusher 6a of the top end inside the inside space 5d of the workpiece 5. Then, the top end of the pusher 6a and the top end of the cutting tool 9 advanced into the workpiece 5 are abutted to each other, the projection 9b of the top end of the cutting tool 9 is inserted in and engaged with the engagement slot 6c of the pusher 6a in the rotating state, and furthermore, the pusher 6a is relatively pushed and moved in the direction as shown by the arrow J with respect to the coiled spring 6d against the elasticity of the coiled spring 6d by pushing the chatter prevention bar 6 by the cylinder driving unit through the coiled spring 6d in the direction as shown by the arrow K.

Then, the cutting tool 9 positioned at the machining starting point H becomes to be pressed state in the direction as shown by the arrow K by a predetermined pressing force caused by the elasticity of the coiled spring 6d of the chatter prevention bar 6 by engaging the projection 9b of the cutting tool 9 with the engagement slot 6c of the chatter prevention bar 6. In this state, the cutting tool 9 is properly moved in the X-axis direction and in the Z-axis direction, similar to normal boring machining, and the top end 9d of the chip 9c moved to a machining finish point I as shown in FIG. 2. Then, turning machining is performed on the inner cylindrical face 5e so as to cut and form a bearing surface 5f by machining and removing the hatching portion of the figure. On this occasion, the chatter attendant on the machining of the bearing surface 5f is effectively restricted and accurate machining face is formed since the top end of the cutting tool 9 is in the state pressed in the direction as shown by the arrow K by the chatter prevention bar 6, as mentioned before. Since the chatter prevention bar 6 is movably held by the coiled spring 6d in the direction as shown by the arrows J and K in the spindle 2 as mentioned before, the engagement state between the cutting tool 9 and the chatter prevention bar 6 is held even if the cutting tool 9 is moved in the direction as shown by the arrows J and K at the time of machining. Then, the occurrence of chatter of the cutting tool 9 is restricted.

After the top end of the chip 9c of the cutting tool 9 reaches a predetermined machining finishing point I and the machining of the bearing surface 5f finishes in this way, the chatter prevention bar 6 is retracted in the direction as shown by the arrow J of FIG. 1 so as to release the engagement state between the cutting tool 9 and the chatter prevention bar 6. Subsequently, the tool holder 7 is rotated and driven in the B-axis direction (in the direction as shown by the arrows Q and R) while being moved and driven in the X-axis direction (in the direction as shown by the arrows J and K) and in the Z-axis direction (in the direction as shown by the arrows N and P) so as to move the top end 9d of the chip 9c to a waiting point S via the points I, G, F, E, D, C, B and A as shown in FIG. 2 in the order opposite to the before-mentioned. Then, the machining on the workpiece 5 finishes.

The above-mentioned embodiment refers to the case where programming is performed by teaching or so in advance when the turning tool, such as the cutting tool 9, is moved in the X-axis direction, in the Z-axis direction and in the B-axis direction from the tool insertion hole, such as the through hole 5c of the workpiece to be machined along the tool shape of the turning tool so as to position the machining portion, such as the top end of the chip 9c at the portion to be machined, such as the inner cylindrical face 5e inside the workpiece. But, in the present invention, the turning tool may be positioned at the portion to be machined by moving the turning tool in the X-axis direction, in the Z-axis direction (in the Y-axis direction, if necessary) and in the B-axis direction from the tool insertion hole, such as the through hole 5c of the workpiece along the tool shape of the turning tool so as not to interfere the turning tool and the workpiece with each other, being judged the interference state between the turning tool and the workpiece by a numerically controlled unit of a machine tool, in addition to the above-mentioned method.

The present invention is explained on the basis of the embodiments heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. Inside diameter machining method in boring machining for machining inside a workpiece using a turning tool having a main body in the shape of a bar with a top end portion which is bent in the shape of a hook, said top end portion having a cutting portion, comprising:

at the time of turning machining where the size of a tool insertion hole of the workpiece into which the turning tool is inserted is smaller than the machining diameter of the portion to be machined inside the workpiece, in the case where said top end portion cannot pass through said insertion hole by only linearly moving said top end portion through said tool insertion hole, whereby said linear movement causes said workpiece and said tool to interfere with each other;

moving said top end portion of said turning tool in first and second directions corresponding to first and second orthogonal axes respectively, and in a third direction which is rotational and has a rotational axis orthogonal to both the first and second axes, to move said top end portion relative to said tool insertion hole of a workpiece to be machined along a bent portion of said top end portion so as to insert said top end portion into said tool insertion hole without interference with said tool insertion hole and positioning said cutting portion of said turning tool at the portion to be machined inside the workpiece; and starting turning machining on the portion to be machined of said workpiece in the above-mentioned state.

2. The inside diameter machining method as set forth in claim 1, wherein said top end portion of said turning tool is held by turning tool holding means provided with a spindle for rotating and driving said workpiece separately from said turning tool at the time of machining of the inside of said workpiece so as to prevent chatter of the turning tool.

3. The inside diameter machining method as set forth in claim 1, wherein (a) the top end portion of said turning tool is inserted into said tool insertion hole, (b) the main body portion of the turning tool continuing to the top end portion is inserted, and (c) the main body portion of the turning tool continuing to the inserted main body portion is inserted when the turning tool is inserted into said workpiece.

* * * * *